US006810329B2

United States Patent
Koga (10) Patent No.: US 6,810,329 B2
(45) Date of Patent: Oct. 26, 2004

(54) NAVIGATION GUIDE DEVICE AND NAVIGATION GUIDE SYSTEM, METHOD THEREOF, PROGRAM THEREFOR, AND MEDIUM FOR STORING THE PROGRAM

(75) Inventor: Yuji Koga, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/407,465

(22) Filed: Apr. 7, 2003

(65) Prior Publication Data

US 2003/0195702 A1 Oct. 16, 2003

(30) Foreign Application Priority Data

Apr. 12, 2002 (JP) ....................................... 2002-110362

(51) Int. Cl.⁷ .............................................. G01C 21/34
(52) U.S. Cl. ................. 701/211; 340/988; 340/995.19; 342/357.09
(58) Field of Search ......................... 701/26, 202, 205, 701/208, 209, 213, 211, 25, 35, 207; 340/905, 988, 995, 995.19, 990, 995.27, 995.1; 342/357.09, 457; 455/456; 709/225, 222, 224, 328, 200

(56) References Cited

U.S. PATENT DOCUMENTS

| 6,070,123 | A | 5/2000 | Beyer et al. ................. 701/209 |
| 6,349,246 | B1 | 2/2002 | Smith et al. ..................... 701/1 |
| 6,430,498 | B1 * | 8/2002 | Maruyama et al. ......... 701/200 |
| 6,549,847 | B2 * | 4/2003 | Ikeuchi et al. .............. 701/208 |
| 6,594,580 | B1 * | 7/2003 | Tada et al. ................... 701/211 |
| 2001/0027375 | A1 * | 10/2001 | Machida et al. ............ 701/209 |
| 2001/0029425 | A1 * | 10/2001 | Myr ........................... 701/200 |
| 2002/0052688 | A1 * | 5/2002 | Yofu .......................... 701/209 |
| 2002/0077748 | A1 * | 6/2002 | Nakano ...................... 701/209 |

FOREIGN PATENT DOCUMENTS

WO    WO 01/19102 A1    3/2001

OTHER PUBLICATIONS

European Search Report of Dec. 30, 2003.

* cited by examiner

Primary Examiner—Thomas C. Black
Assistant Examiner—Tuan C To
(74) Attorney, Agent, or Firm—Armstrong, Kratz, Quintos, Hanson & Brooks, LLP (57) ABSTRACT

A communication state monitoring section 35 of a terminal unit 2 installed in a vehicle checks whether communication is possible between the terminal unit 2 and a server system 3. If the section in question finds communication is not possible, information regarding the current position of the vehicle and its target point and search condition acquired by the terminal unit 2 is stored in an internal memory, and communication is suspended. Communication state is checked at predetermined intervals. As soon as it is confirmed that communication is possible, the server system 3 determines a path to be taken by the mobile body and a signal notifying the path is transmitted to the terminal unit 2, which then guides the navigation of the vehicle. According to this system, it is not necessary to restart operations even if communication is interrupted and recovers after a certain interval, which will improve the utility of the system.

20 Claims, 3 Drawing Sheets

NAVIGATION GUIDE DEVICE AND NAVIGATION GUIDE SYSTEM, METHOD THEREOF, PROGRAM THEREFOR, AND MEDIUM FOR STORING THE PROGRAM

BACKGROUND OF THE INVENTION

1. Field of the Invention

The present invention relates to a navigation guide device for guiding the navigation of a mobile body by providing the mobile body with information about possible events encountered along a path to be taken by the mobile body to reach a target point, a system incorporating the navigation guide device and a navigation guide method using the device and system, and a program therefor, and a medium for recording the program.

2. Description of Related Art

The conventional well-known system for guiding the movement of a mobile body such as a motor vehicle, aircraft and ship includes navigation guide systems. The navigation guide system detects the current position of a mobile body, and recognizes a target point provided by the user, and chooses an appropriate path connecting the current position with the target point. The navigation guide system displays the current position in connection with the path to be taken on a map, and provides necessary information en route at crucial points until the target point is reached.

The conventional navigation guide system incorporates a drive unit for reading map information from a recording medium such as a CD-ROM (Compact Disk-Read Only Memory) or DVD-ROM (Digital Versatile Disk-Read Only Memory). For such a navigation guide system to be installed in a limited space within a mobile body, it is necessary to make the system smaller and lighter. Furthermore, for the navigation guide system to be able to guide the mobile body smoothly to any given target point at all times, it is necessary to replace every year an old recording medium with a new recording one carrying updated map information, which may cost the user considerably.

In view of this, recently being supported by the progress of communication technology, a new navigation guide system based on wireless communication is proposed in which map information updated as appropriate by a map information provider is stored in a server system, and the user provides the server system with necessary information using a terminal installed in his/her mobile body, so that the server system can determine an appropriate path for the user's mobile body, and transmit a radio signal carrying the information to the user's terminal.

However, such a navigation guide system based on wireless communication has a number of problems. For example, if the mobile body is a vehicle and the vehicle passes underground or through a tunnel, communication will be interrupted, and the user will not be able to provide a server system with information regarding the vehicle's current position, nor to receive a signal from the server system carrying information about a path to be taken by the user's vehicle. In short, the user will be unable to receive navigation guide which would be otherwise provided by the server system. This awkward situation often occurs when the vehicle starts to move. Generally, the user wants to be informed of a path he/she should take before he/she moves his/her vehicle, and the parking place is often located underground or in a closed space within a building which may reject wireless communication. Then, the user would not be able to receive guidance from the start which would be otherwise provided by the server system. To avoid this awkward situation, the user must firstly move his/her vehicle to a nearby open space where wireless communication is possible, park the vehicle at a safe spot there, and start complicate operations necessary for being informed of an appropriate path. This will cost time and labor which will encroach on the utility of the system.

To cope with this disadvantage, it is possible to introduce a terminal which will ensure wireless communication even when the vehicle carrying the terminal is in a closed space within a building, or runs underground or through a tunnel. However, such a terminal will be generally so voluminous and complicated that practical use thereof would be difficult.

SUMMARY OF THE INVENTION

In view of above, a principal object of this invention is to provide a navigation guide device by which one can easily determine an appropriate path for reaching a target point, a system incorporating the device, and a method thereof, and a program therefor and a recording medium for recording the program.

The navigation guide device of this invention comprises current position acquisition section for acquiring information regarding the current position of a mobile body; target point acquisition section for acquiring information regarding a target point the mobile body wants to reach; information storing section for storing information regarding the current position and target point; communication state monitoring section which monitors signal transmission state under which transmission of a signal notifying the current position and target point to a path determining section should occur so that the path determining section can determine an appropriate path connecting the current position with the target point, as well as signal reception state under which reception of a signal notifying the appropriate path determined by the path determining section should occur; guide information presenting section for presenting guide information based on the received information about the appropriate path; and communication control section which, if the communication state monitoring section finds communication is impossible, causes the information storing section to store information regarding the current position and target point until communication becomes possible again and transmission of the information regarding the current position and target point is completed.

According to said aspect of this invention, the communication state monitoring section monitors signal transmission state under which transmission of a signal notifying the current position of a mobile body acquired by the current position acquisition section and a target point the mobile body wants to reach acquired by the target point acquisition section should occur, as well as signal reception state under which reception of a signal notifying a path to be taken by the mobile body determined by the path determining section based on the received information regarding the current position and target point. The communication control section instructs, if the communication state monitoring section finds communication is not possible, the information storing section to store the information regarding the current position and target point until communication becomes possible and transmission of the information regarding the current position and target point is completed. Thus, the information regarding the current position and target point is kept stored in the information storing section as long as communication is impossible, until a communicable state reappears and the guide information presenting section acquires updated information regarding a path to be taken by the mobile body. This eliminates the need for the renewed operation which will involve reentry of information regarding the current position and target point. This will lead to the improved utility of the device.

According to the navigation guide device of this invention, preferably the communication control section permits the path determining section to determine a path to be taken by a mobile body based on information regarding the current position and target point transmitted by the mobile body as long as communication is possible, and it instructs the information storing section to store the information regarding the current position and target point of the mobile body until information about the determined path is received.

According to this invention, as long as communication is possible, the path determining section is allowed to determine an appropriate path based on the received information regarding the current position of a mobile body and its target point, while the communication control section instructs the information storing section to store the information regarding the current position and target point until information about an appropriate path determined by the path determining section is received. Thus, until transmission of a signal notifying the current position of a mobile body and its target point is achieved, and reception of a signal notifying an appropriate path which the path determining section has determined based on the information regarding the current position and target point is achieved, the information regarding the current position and target point is kept stored, which will ensure the acquisition of the appropriate path by the mobile body.

According to the navigation guide device of this invention, it is preferred for the communication control section to keep, as long as communication is impossible, the device at a stand-by state to transmit a signal notifying the current position of a mobile body and its target point, and to receive a signal notifying a path to be taken by the mobile body determined by the path determining section, until the communication state monitoring section finds communication is possible.

According to this invention, the communication control section keeps the device at a stand-by state where the device is ready to transmit a signal notifying the current position of a mobile body and its target point and to receive a signal notifying a path to be taken by the mobile body determined by the path determining section, until the communication monitoring section finds communication is possible. This allows the device to be kept at a stand-by state while being relieved of actual communication until communication becomes possible, which will reduce loads involved in information handling and communication, and thus improve the information handling efficiency of the system.

According to the navigation guide device of this invention, preferably the communication control section will not put the device out of the stand-by state until it finds transmission of necessary data and reception of necessary information are completed.

According to the navigation guide device of this invention, the communication control section will put the device out of a stand-by state only after it finds transmission of necessary data and reception of necessary information are completed. Thus, even if this device is configured so as to set a path to be taken integrally, the degradation of information handling efficiency due to the accumulation of stand-by state is prevented.

According to the navigation guide device of this invention, preferably the communication state monitoring section checks at predetermined intervals whether communication is possible, and the communication control section allows communication to be restarted based on a monitoring result provided by the communication state monitoring section.

According to this invention, the communication state monitoring section checks at predetermined intervals whether communication is possible, and the communication control section allows communication to be restarted based on a monitoring result provided by the communication state monitoring section. Thus, it is not necessary for the communication state monitoring section to check at all times whether communication is possible, which will reduce a load involved in communication, and improve the efficiency of communication.

A navigation guide system of this invention comprises a navigation guide device as described above, a server system with a path determining section as described above which can communicate with the navigation guide device, and communication section enabling the navigation guide device and the server system to communicate with each other.

The present invention provides a server system with a path determining section which can communicate with a navigation guide device as described above by virtue of communication section. If the server system is connected to plural navigation guide devices, and determines an appropriate path for each of the devices, the configuration of each device will be simplified. Moreover, even if communication interrupted en route is recovered, it will be possible for each device to readily obtain information about an appropriate path without restarting operation for acquiring information regarding the current position and target point, which will lead to the enhanced utility of the system.

The navigation guide system of this invention comprises a terminal unit having current position acquisition section for acquiring information regarding the current position of a mobile body, target point acquisition section for acquiring information regarding a target point the mobile body wants to reach, information storing section for storing information regarding the current position and target point, and a terminal device with guide information presenting section for presenting guide information about a path to be taken by the mobile body determined based on the information regarding the current position and target point; a server system having a path determining section for determining a path to be taken by the mobile body based on the information regarding the current position and target point; communication section for allowing a signal notifying the current position and target point to be transmitted from the terminal unit to the path determining section of the server system, and a signal notifying the path determined by the path determining section to be transmitted from the server system to the terminal unit; communication state monitoring section for monitoring the communication state of the communication section; and a communication control section which, if the communication state monitoring section finds communication is not possible, instructs the information storing section to store the information regarding the current position and target point until communication becomes possible and transmission of the information regarding the current position and target point is completed.

According to said aspect of this invention, the communication state monitoring section monitors communication state between the terminal unit and the server system, that is, transmission of an upward signal from the terminal unit carrying information regarding the current position of a mobile body and its target point to the path determining section of the server system, as well as reception of a downward signal by the terminal unit carrying information regarding a path to be taken by the mobile body determined by the path determining section based on the information regarding the current position and target point and transmitted by the server system. The communication control section instructs the information storing section to store the information regarding the current position and target point whenever the communication state monitoring section finds communication is impossible, until a communicable state reappears and transmission of information regarding the current position and target point and reception of information regarding a path to be taken by the mobile body are completed. Thus, the information regarding the current position and target point is stored in the information storing section as long as communication is impossible, until a communicable state reappears and the guide information presenting section acquires updated information regarding a path to be taken by the mobile body, which will eliminate the need for renewed operation involving the reentry of the current position and target point which will improve the utility of the system.

According to the navigation guide system of this invention, preferably the server system comprises a memory section which can store information about an appropriate path determined by the path determining section, as long as the terminal unit cannot receive the information.

According to the present invention, the server system comprises a memory section which can store information about an appropriate path determined by the path determining section, as long as the terminal unit cannot receive the information. This permits the terminal unit to securely obtain information about an appropriate path even if communication is interrupted en route.

According to the navigation guide system of this invention, preferably the server system causes information about an appropriate path stored in its memory section to be transmitted to the terminal unit as soon as the communication state monitoring section finds communication is possible.

According to the present invention, the server system causes information about an appropriate path stored in the memory section to be transmitted to the terminal unit as soon as the communication state monitoring section finds communication is possible. This permits the terminal unit to securely obtain information about an appropriate path recently determined as soon as a communicable state reappears.

The navigation guide method of this invention for guiding, by section of calculation section, the navigation of a mobile body by providing the mobile body with necessary information at critical points along a path connecting the current position of the mobile body with its target point comprises the steps of acquiring information regarding the current position of the mobile body and its target point; transmitting the information regarding the current position and target point; monitoring the reception of a signal carrying information about a path determined based on the information regarding the current position and target point; and, if the monitoring step reveals the impossibility of communication, storing the information regarding the current position and target point in such a manner as to allow ready reading-out until a communicable state reappears and transmission of a signal notifying the current position and target point is completed.

The method comprising those steps will ensure the same advantages as will be obtained from a navigation guide device as described above.

According to the navigation guide method of this invention, the same features and advantages as will be seen in a navigation guide device as described above will be ensured because the features of the navigation guide device are also shared by the navigation guide method.

According to the navigation guide method of this invention, the same advantages as will be obtained from a navigation guide device as described above will be ensured. According to the navigation guide method, preferably information regarding the current position of a mobile body and its target point is fed via a terminal unit installed in the mobile body; a signal carrying information regarding the current position and target point is transmitted via the terminal unit to a server system, thereby permitting the server system to determine a path to be taken by the mobile body; and the terminal unit receives a signal carrying information about the path transmitted by the server system, so as to provide the user with the information about the path to be taken by the mobile body.

According to this invention, information regarding the current position of a mobile body and its target point fed via a terminal unit installed in the mobile body is transmitted to a server system so that an appropriate path to be taken by the mobile body can be determined there and a signal carrying information about an appropriate path to be taken by the mobile body to be transmitted to the terminal unit, the terminal unit thereby providing the user of the mobile body with the information about the appropriate path. Thus, the server system, even when being connected with plural terminal units, determines an appropriate path for each of the terminal units, thereby simplifying the configuration of each terminal unit. Moreover, even if communication is interrupted, and a communicable state reappears after an interval, each terminal unit can readily obtain information about an appropriate path without resorting to renewed operation for acquiring information regarding the current position and target point which would be otherwise required, which will contribute to the improved utility of the system.

The advantages mentioned above with regard to the navigation guide system will also apply to the navigation guide method of this invention, and thus the navigation guide method of this invention will have the same advantages.

A navigation guide program of this invention is so designed as to effect the navigation guide method by the use of calculation section.

According to the present invention, if the terminal unit installs a general purpose computer as calculation section, the navigation guide method can be effected by the computer which will greatly improve the utility of this invention.

A recording medium of this invention records the navigation guide program for effecting the navigation guide method of this invention in such a form as to allow the ready reading-out of the program.

According to the present invention, because the program by way of which the navigation guide method of this invention is practiced is recorded in the recording medium, handling of the navigation program becomes so easy that the utility of this invention is greatly improved.

The calculation section to effect the program of this invention recorded in a recording medium may include, to mention a few for example, a personal computer or plural computers organized into a network, or a circuit element such as a CPU represented by a principal IC of a microcomputer, a circuit board carrying plural electric components, etc.

DETAILED DESCRIPTION OF THE PREFERRED EMBODIMENT

An embodiment of the present invention will be described below with reference to the drawings.
[Organization of Navigation System]

Figure 1:
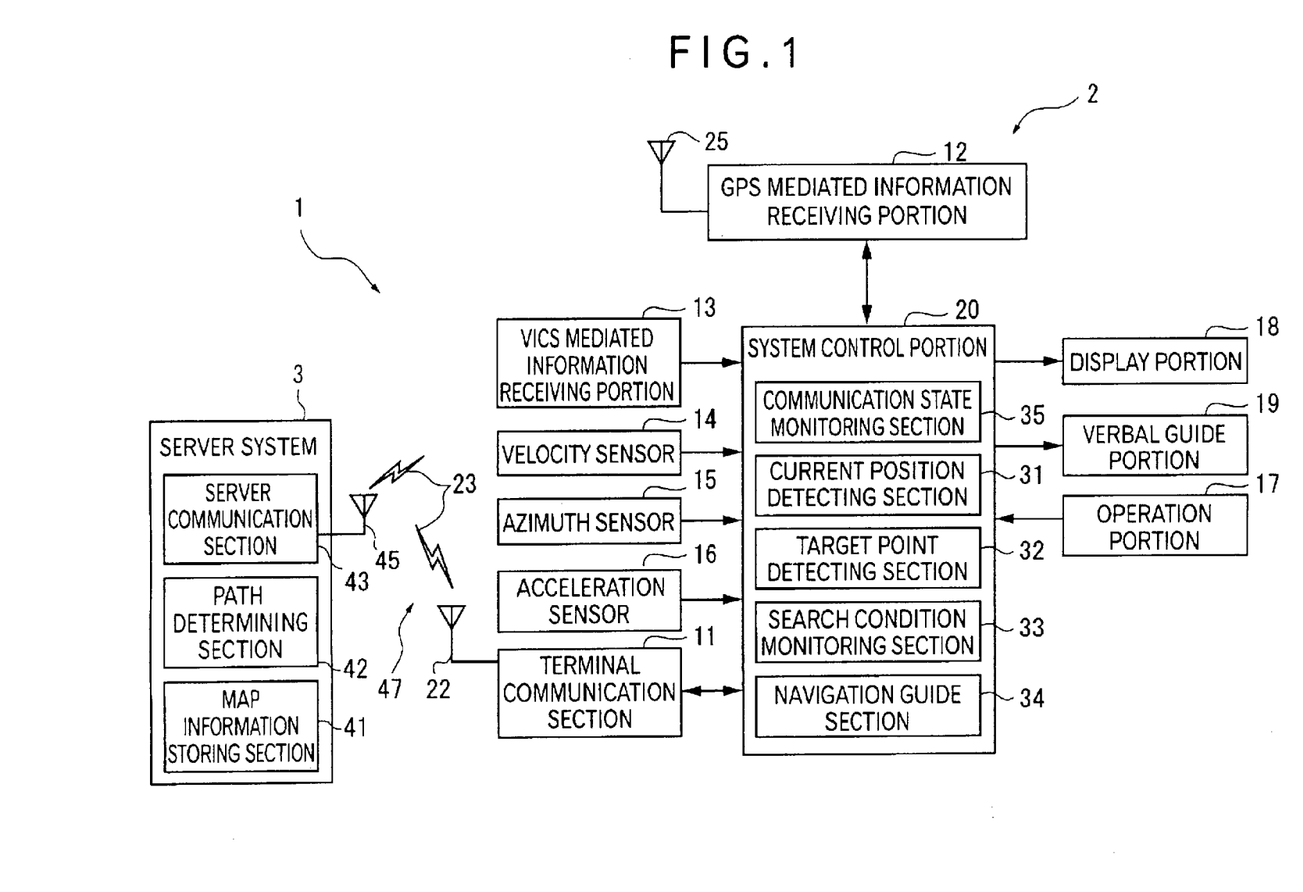
FIG. 1 is a block diagram for illustrating the simplified organization of a navigation guide system representing an embodiment of this invention.

FIG. 1 is a block diagram for illustrating the simplified organization of a navigation guide system embodying this invention. In FIG. 1, 1 represents the navigation guide system. The navigation guide system 1 transmits information about a path to be taken by a mobile body not illustrated here including a vehicle such as a car, to thereby guide the driving of the mobile body. The navigation guide system 1 comprises a terminal unit 2 and a sever system 3.

The terminal unit 2 is installed in a vehicle, and operates via electric power supplied by a battery installed in the vehicle. The terminal unit 2 comprises a terminal communication section 11, GPS (Global Positioning System) mediated information receiving portion 12, VICS (Vehicle Information and Communication System) mediated information receiving portion 13, velocity sensor 14, azimuth sensor 15, acceleration sensor 16, operation portion 17, display portion 18, verbal guide portion 19, and system control portion 20 or a calculation section which also serves as a communication control section.

The terminal communication section 11 has an antenna 22. The terminal communication section 11 is connected to the system control portion 20, and transmits under the control of the system control portion 20 information provided by the system control portion 20 to the sever system 3 by way of a medium 23 for wireless communication, and receives information transmitted by the server system 3 to deliver it to the system control portion 20. The medium 23 may include any known medium for wireless communication such as electromagnetic waves, light, sound waves, etc.

The GPS mediated information receiving portion 12 has a GPS antenna 25. The GPS mediated information receiving portion 12 receives via the GPS antenna 25 an RF wave carrying navigation information transmitted by a GPS satellite or an artificial satellite not illustrated here. The GPS mediated information receiving portion 12 determines, by calculation, a current position of the vehicle on a miniature coordinate system based on the signal received, and sends the current position as GPS data to the system control portion 20.

The VICS mediated information receiving portion 13 has a VICS antenna not illustrated here, and collects via the antenna information regarding traffics ahead. Specifically, the portion in question receives an optical signal or FM multiplexed wave broadcast from a VICS not illustrated here, and obtains information about traffic jams, accidents, road constructions and traffic regulations which would be encountered along the path to be taken by the vehicle. The information acquired thus about traffics ahead the current position is delivered to the system control portion 20.

The velocity sensor 14 is installed in the vehicle, and determines the velocity of the vehicle and its acceleration based on signals changing in correspondence with the velocity of the vehicle. The velocity sensor 14, for example, counts or reads pulse signals or voltage delivered or accumulated with the rotation of a wheel or wheel axis. The velocity sensor 14 delivers the pulse count or voltage measurement thus acquired to the system control portion 20.

The azimuth sensor 15 is installed in the vehicle, has a so-called gyrosensor, and detects the heading of the vehicle. The azimuth sensor 15 delivers a signal carrying the vehicle's current heading to the system control portion 20.

The acceleration sensor 16 is installed in the vehicle, and detects the acceleration of the vehicle in the direction of its heading. The acceleration sensor 16 converts the acceleration thus detected into a corresponding pulse count or voltage, and delivers it to the system control portion 20.

The operation portion 17 includes various operation buttons not illustrated here by which the user can instruct the terminal unit 2 to display, for example, the current driving condition of the vehicle. When the user presses an operation button, the operation portion 17 delivers an appropriate signal according to the button depressed to the system control portion 20, and causes the terminal unit 2 to perform an operation determined by the depressed button, for example, display of the current driving condition or setting of a target point. The operation portion 17 allows the user to feed input. Input feeding may occur in any known manner, for example, via a touch panel placed on the display portion 18 or verbal input instead of operation buttons as described above.

The display portion 18 is controlled by the system control portion 20, and displays image data delivered by the system control portion 20. The image data includes map information and additional information transmitted by the server system 3 as will be described later, as well as TV image data received by a TV receiver unit or image data read out via a driving unit from a recording medium such as an optical or magnetic disk. The display portion 18 may be based, for example, on a liquid crystal display (LCD), organic electroluminescence (EL), plasma display panel (PDP), or cathode ray tube (CRT).

The verbal guide portion 19 may include, for example, sound reproducing section such as a speaker not illustrated here. The verbal guide section 19 provides the driver and passengers by voice with information necessary for secure driving such as the current heading and driving condition of the vehicle. The voice reproducing section can also deliver as needed TV voice data received by the TV receiving unit or audio data read out from a recording medium such as an optical or magnetic disk. The verbal guide portion 19 does not need to have its own sound reproducing section but may use a speaker installed in the vehicle as the sound reproducing section.

The system control portion 20 has various ports for input and output not illustrated here. The input port may include, for example, a communication port connected to the terminal communication section 11, GPS receiving port to which GPS meditated information receiving section 12 is connected, VICS signal receiving port connected to the VICS mediated information receiving portion 13, sensor ports connected to sensors 14, 15 and 16, keyboard input port connected to the operation portion 17, display control port connected to the display portion 18, and verbal input control port connected to the verbal guide portion 19. The system control portion 20 also includes an internal memory not illustrated here. The internal memory stores various programs operable on the platform of an OS (Operating System) which governs the overall operation of the terminal unit 2. The system control portion 20 includes, among such various programs, current position determining section 31, target point detecting section 32, search condition monitoring section 33, navigation guide section 34, and communication state monitoring section 35.

The current position determining section 31 determines the current position of the vehicle. Specifically, the section in question determines by calculation a few candidate locations as to the current position of the vehicle based on the velocity and azimuth data provided by the velocity and azimuth sensors 14 and 15; determines the coordinates of the current position of the vehicle in a miniature coordinate system based on the GPS data delivered by the GPS mediated information receiving portion 12; compares the calculated candidate locations with the GPS mediated coordinate data to determine the true current position of the vehicle and plots the position on a map presented on the display portion 18.

The current position determining section 31 determines, when the vehicle runs an uphill to reach a flat, the gradient of the uphill and height of the flat, based on the data delivered by the acceleration sensor 16 during the run, and chooses as a result of calculation a few candidate positions, and then determines a true current position. Thus, even if the vehicle runs on a curved ramp intersection of a highway where any point on the road has a number of vertical overlaps when viewed flatly, the section in question can accurately determine the current position of the vehicle. Moreover, even when the vehicle runs on a mountain trail or upward slope, the section in question detects the difference between the travel distance calculated based on the data from the velocity and azimuth sensors, and distance actually traveled by the vehicle, and corrects the calculated distance by making allowance, for example, for the gradient of the slope, and determines the accurate current position of the vehicle.

The current position determining section 31 may determine or choose, as a current position, a start position which was initially fed via the operation portion 17 instead of the actual current position of the vehicle. Various data obtained by the current position determining section 31 are delivered to the internal memory within the system control portion 20 which serves as section for storing information.

The target point detecting section 32 obtains information about the target point fed via the operation portion 17, and locates the target point. The information about the target point may include any knowledge about the point such as the coordinates of the target point, e.g., its latitude and longitude, the address and phone number of a resident living on the spot, etc. The information obtained by the target point detecting section 32 will be stored in the internal memory.

The search condition monitoring section 33 monitors a condition fed via the operation portion 17 according to which a target point should be determined. The condition may include the shortest time, shortest distance or least traffic congestion or regulation which must be satisfied when a path is determined for the target point. The condition fed via the operation portion will be stored in the internal memory.

The navigation guide section 34 delivers information about a path to be taken by the vehicle to reach the target point fed previously and stored in the internal memory, that is, information necessary for the smooth approach of the vehicle to the target point to the display portion 18 for visual display and to the verbal guide portion 19 for verbal announcement. For example, the navigation guide section 34 causes the display portion 18 to display a symbol such as an arrow as appropriate on the screen, or the verbal guide section 19 to deliver a speech, e.g., "Turn right at an XX intersection 700 m ahead towards YY," "You have missed the path," or "Traffic congestion ahead."

The communication state monitoring section 35 monitors communication state between the terminal communication section 11 and the server system 3, that is, checks whether communication is possible between the terminal unit 2 and the server system 3. The checking is achieved by causing the terminal communication section 11 to send signals at predetermined intervals and seeing whether corresponding return signals transmitted by the server system 3 can be received, or by receiving signals transmitted by the server system 3 at predetermined intervals and checking whether the reception of the signals is possible even when the sensitivity of the terminal communication section is reduced below a certain threshold level.

The server system 3 comprises a map information storing section 41, path determining section 42 and server communication section 43.

The map information storing section 41 stores information necessary for guiding the navigation of a vehicle such as road maps, and notable terrestrial objects along roadsides as will be described later, in such a form as to allow the information to be readily read out. For example, the map information storing section 41 has a drive unit not illustrated here for reading map information recorded in an optical disk such as DVD-ROM (Digital Versatile Disk-Read Only Memory), or in a magnetic disk such as a hard disk.

The path determining section 42 determines an appropriate path connecting a current position of a vehicle with a target point based on the current position and target point transmitted by the terminal unit 2 by referring to map information fetched from the map information storing section 41. Specifically, the section in question chooses some candidate paths between the current position and target point based on the map information, and determines an appropriate one depending on the search condition fed previously, e.g., a shortest path, a path requiring a shortest travel time, or a path along which traffic congestion or regulation will be minimal.

The sever communication section 43 has a server communication antenna 45. The server communication section 43 constitutes a communication section 47 in combination with the terminal communication section 11 of the terminal unit 2. The server communication section 43 receives information regarding the current position and target point, and search condition transmitted via a wireless communication medium 23 by the terminal communication section 11, while it transmits information about an appropriate path determined by the path determining section and map information via the wireless communication medium 23 to the terminal communication section 11 of the terminal unit 2.

Operation of the Navigation Guide System

Next, operation of the navigation guide system 1 will be described with reference to FIGS. 2 and 3.

Figure 2:
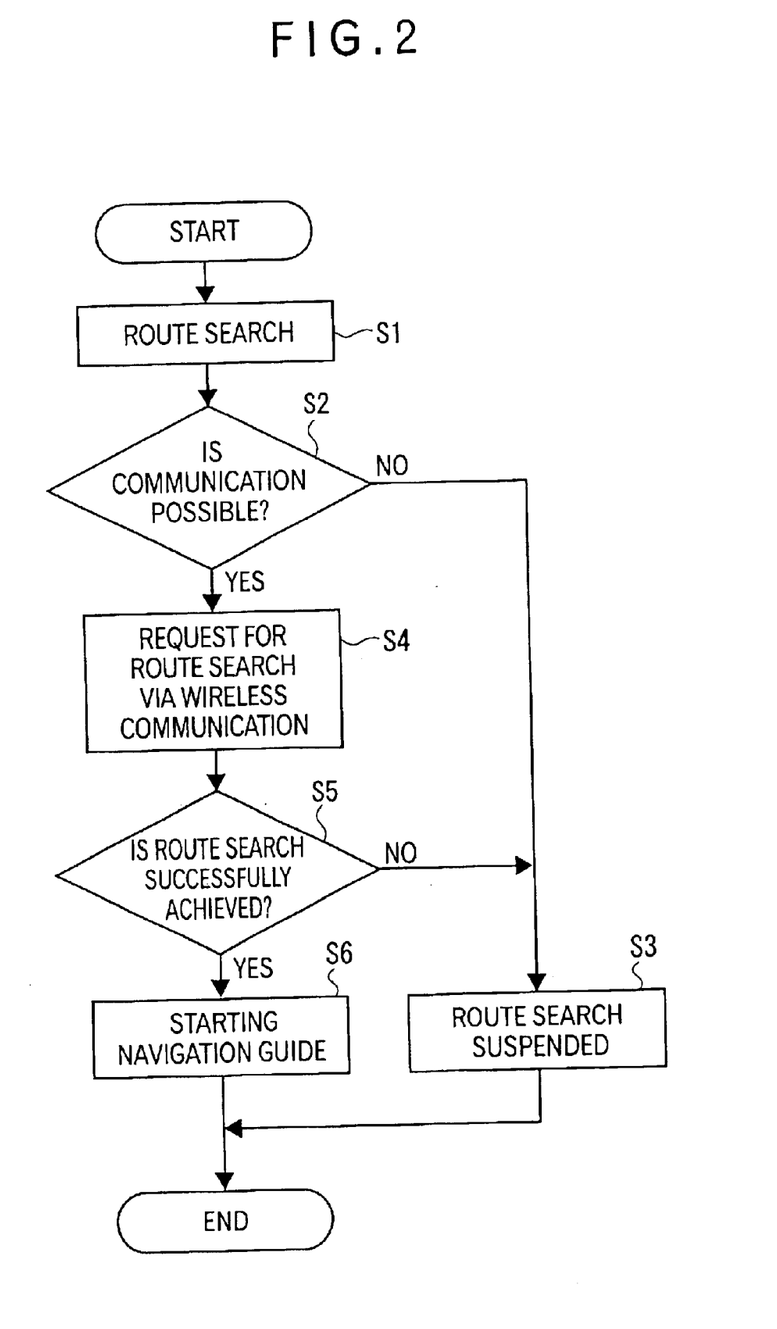
FIG. 2 is a flowchart for illustrating the steps taken by the navigation guide system representing the embodiment for guiding the navigation of a mobile body.

FIG. 2 is a flowchart for illustrating the steps taken by the navigation guide system for guiding the navigation of a mobile body. FIG. 3 is a flowchart for illustrating the communication steps taken by the navigation guide system for finding an appropriate path for guiding a mobile body to a target point (route search).

Firstly, the user driving a vehicle turns on the power switch of terminal unit 2 to supply the unit with power. Being supplied with power, the system control portion 20 instructs the display portion 18 to display a main menu so as to urge the user to feed data necessary for finding an appropriate path to reach a target point including a search condition under which the search should be made. The user feeds a search command by operating on the operation portion 17 (step S1).

On receipt of the search command at step S1, the system control portion 20 instructs the current position determining section 31 to determine the current position of the vehicle, the target point detecting section 32 to detect the target point and the search condition monitoring section 33 to recognize the search condition.

Specifically, the system control portion 20 instructs the current position determining section 31 to determine by calculation the current position of the vehicle based on the velocity and heading data of the vehicle provided by the velocity and azimuth sensors 14 and 15, and on the GPS data of the current position provided by the GPS mediated information receiving portion 12. Information regarding the current position of the vehicle thus acquired is stored in the internal memory.

The system control portion 20 also instructs the display portion 18 to present a display that urges the user to feed a target point. When the user feeds, being guided by the display, a target point by operating on the operation portion 17, the target point detecting section 32 collects information about the target point. Information about the target point thus collected is stored in the internal memory.

The system control portion 20 further instructs the display portion 18 to present a display that urges the user to feed an appropriate search condition. When the user feeds, being guided by the display, an appropriate search condition by operating on the operation portion 17, the search condition monitoring section 33 collects information about the search condition. Information about the search condition thus collected is stored in the internal memory.

Then, the system control portion 20 instructs the communication state monitoring section 35 to check communication state between the terminal unit 2 and the server system 3, that is, communication state of the communication section 47 (step S2).

If the communication state monitoring section 35 finds communication is impossible at step S2, the system control portion 20 causes information regarding the current position and target point and search condition to be stored as before in the internal memory, and suspends route search operation, that is, puts the communication section 47 at a stand-by state (step S3), and discontinues the navigation guide operation.

On the contrary, if the communication state monitoring section 35 finds communication is possible at step S2, the system control portion 20 instructs the terminal communication section 11 to transmit information regarding the current position and target point and search condition stored in the internal memory via the wireless communication medium 23 to the server system 3 to cause the latter to determine an appropriate path based on the information (step S4). The information used in the route search may also include information unique to the terminal unit such as its ID (identification) number.

At step S4, the terminal communication section 11 of the terminal unit 2 transmits a signal carrying information regarding the current position and target point and search condition to the server system 3. The server system 3 receives via the server communication section 43 the signal transmitted by the terminal unit 2. The server system 3 transfers the information regarding the current position and target point and search condition to the path determining section 42. On receipt of the information, the path determining section 42 fetches map information from the map information storing section 41. The path determining section 42 searches for an appropriate path based on the information regarding the current position and target point through the map information, and picks up plural candidate paths. The path determining section 42 narrows the search to a few out of the plural candidate paths based on the search condition, and ultimately determines a path best matching with the search condition fed by the user.

Then, the server system 3 instructs the server communication section 43 to transmit a signal carrying information about the appropriate path via the wireless communication medium 23 to the terminal unit 2. Transmission of the signal from the server system 3 to the terminal unit 2 may occur, for example, only after the server system 3 has received an ID number from the terminal unit 2 together with information necessary for route search at step S4, so that access to the signal can be permitted only to the terminal unit 2 requiring the search, or conversely only the terminal unit 2 having received an ID number from the server system 3 can gain access to the signal.

When the server system 3 transmits a signal carrying required information, the terminal unit 2 receives the information via the terminal communication section 11. Prior to the reception of the signal, the communication state monitoring section 35 checks whether communication is possible (step S5).

If the communication state monitoring section 35 finds communication state is so much disturbed that communication is impossible at step S5, information about the appropriate path is temporarily stored in a memory section not illustrated here of the server system 3. Then, operation proceeds to step S3 where communication is suspended, and the navigation guide operation is discontinued.

If the system control portion 20 is informed of the information about the appropriate path has been received, it concludes reception of necessary information is completed. Specifically, the system control portion 20 concludes that the terminal unit 2 has transmitted information regarding the current position and target point and search condition to the server system 3, that the server system 3 has determined an appropriate path based on the information transmitted by the terminal unit 2, and that the terminal unit 2 has received information about the appropriate path transmitted by the server system 3. Information about the appropriate path currently acquired is stored in the internal memory of the terminal unit 2.

The system control portion 20 recognizes how the vehicle has moved based on data provided by the velocity, azimuth and acceleration sensors 14, 15 and 16, and on GPS data provided by the GPS mediated information receiving section 12. The system control portion 20 guides the navigation of the vehicle by providing the driver with information necessary for proper driving such as the vehicle's track currently obtained and the appropriate path received from the server system 3 (step S6), and completes the navigation guide operation.

Figure 3:
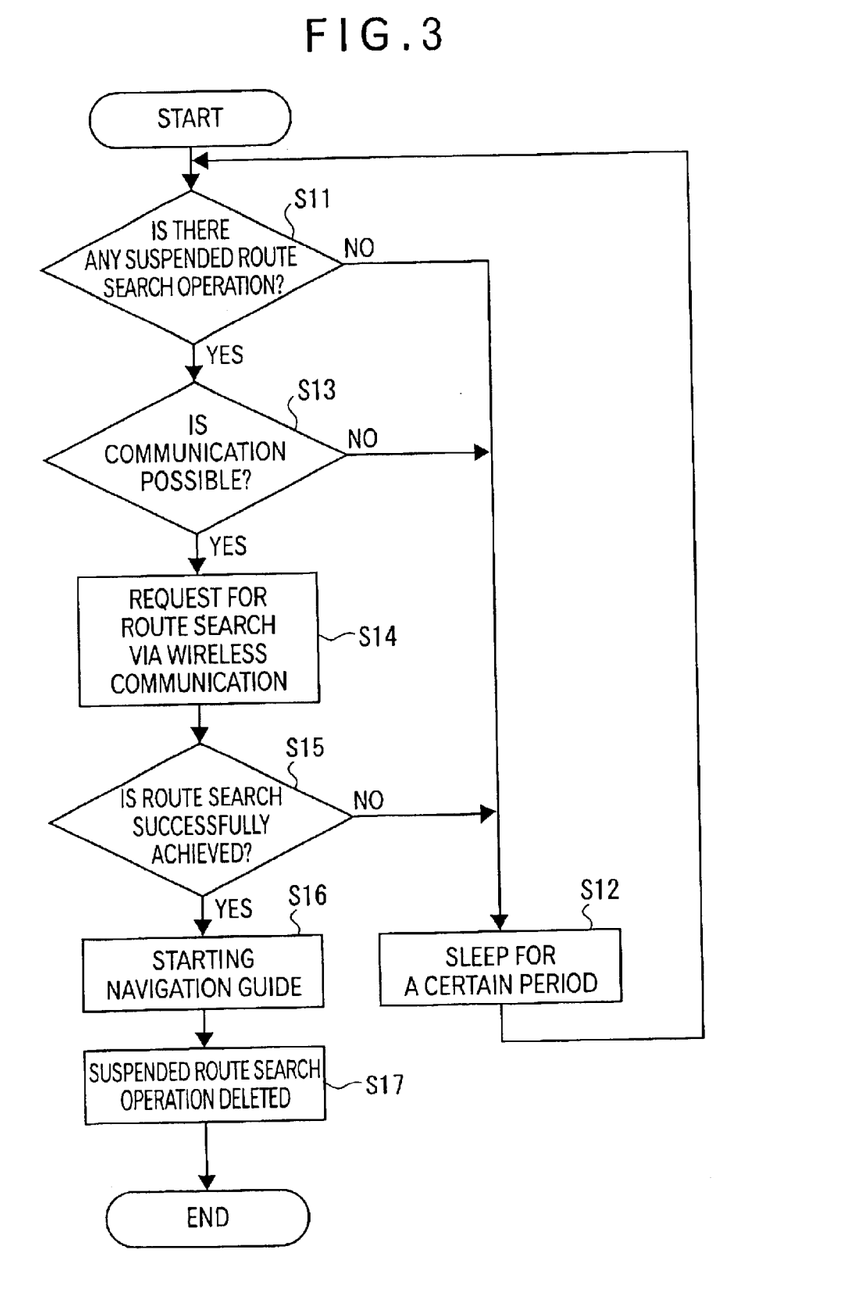
FIG. 3 is a flowchart for illustrating the manner how a path to be taken by a mobile body is determined by the navigation guide system representing the embodiment.

If operation proceeds to step S3 where route search is suspended, subsequent operation will proceed, for example, as seen in FIG. 3. The system control portion 20 checks whether there is any suspended operation at step S3 (step S11).

If the system control portion 20 finds there is no suspended operation at step S3, it enters into a stand-by state for route search (step S12). This stand-by state for route search taken at step S12 reappears each time necessary information is transmitted from the terminal unit, and an appropriate path transmitted from the server system 3 is received by the terminal unit 2, namely, the system control portion 20 proceeds, after having taken a stand-by state for a certain period following each route search, to step S11.

If the system control portion 20 finds at step S11 there is a suspended operation introduced at step S3 of FIG. 2, it instructs the communication state monitoring section 35 to check whether communication is possible (step S13). If the communication state monitoring section 35 finds communication is not possible at step S13, operation proceeds to step S12 where the system control portion takes a stand-by state.

On the other hand, if the communication state monitoring section 35 finds communication is possible at step S13, the system control portion 20 instructs, as in step S4 of FIG. 3, the terminal communication section 11 to fetch information regarding the current position and target point and search condition from the internal memory and to transmit a signal carrying the information via the wireless communication medium 23 to the server system 3, so that the server system can determine an appropriate path based on the information (step S14).

Then, the server system 3 instructs the path determining section 42 to determine an appropriate path based on the information, and causes a signal carrying information about the appropriate path to be transmitted to the terminal unit 2. If a signal carrying information about an appropriate path has been prepared but suspended owing to disturbed communication state, and the information has been stored in the internal memory, the server system 3 fetches the information from the memory and causes a signal carrying the information to be transmitted.

Prior to reception of the signal, the terminal unit 2 instructs the communication state monitoring section 35 to check communication state (step S15). If the communication state monitoring section 35 finds communication state is disturbed, and it is still impossible for the terminal unit 2 to receive the signal, operation proceeds to step S12 where the route search operation is suspended.

If the communication state monitoring section 35 finds communication is possible, and indeed the terminal communication section 11 succeeds in receiving the signal carrying information about the appropriate path at step S15, the system control portion 20 concludes, as in step S6 of FIG. 2, communication of necessary signals is completed, and necessary information for the route search is collected, and starts the navigation guide operation S16. The system control portion 20 deletes the suspended route search operation S17, and starts a renewed navigation guide operation.

If the server system 3 is informed that the terminal unit 2 has obtained information about the appropriate path, it starts operation necessary for deleting the information about the path stored in the memory section. The server system 3 can recognize the successful reception by the terminal unit 2 of information about the appropriate path, for example, by receiving a signal transmitted by the terminal communication section 11 signifying that the terminal unit 2 has received the information in question.

As described above, the system monitors communication state under which a signal carrying information regarding the current position and target point and search condition fed by the user is transmitted by the terminal unit 2 towards the server system 3, and under which a signal carrying information about an appropriate path determined by the server system 3 is transmitted by the server system 3 towards the terminal unit 2, and if it finds communication is not possible, it causes information regarding the current position and target point and search condition to be stored in the internal memory, until a communicable state reappears and transmission of a signal carrying information regarding the current position and target point and search condition to the server system 3 is completed. Thus, necessary information is kept stored as long as communication state is so much disturbed that it is impossible for the navigation guide section 34 to obtain information necessary for proper guidance, e.g., information about an appropriate path. This eliminates the need for reentering data for acquiring an appropriate path, which will improve the utility of the system.

Moreover, because the necessary data is stored in the internal memory of the terminal unit 2 until a signal carrying the data is transmitted to the server system 3 and a signal notifying an appropriate path determined by the server system 3 is received by the terminal unit 2, the terminal unit 2 can securely acquire information about the appropriate path determined based on the data which is still stored in its memory.

The terminal unit takes a stand-by state as long as communication state is disturbed, that is, stays away from communication operation until it finds communication is possible, and thus useless operation and communication are effectively avoided, which will improve the efficiency of the system.

The terminal unit exits from the stand-by state only after it has received a signal notifying an appropriate path. Therefore, even if the system is so configured that a single server system 3 determines appropriate paths for plural terminal units, the stand-by state continues for each terminal unit as long as communication is impossible for the unit, and useless communication operation is so effectively arrested in the meantime for the unit that wasteful consumption of the memory space of each terminal unit can be effectively avoided which will prevent the reduced communication efficiency of the system at large which would otherwise result.

In the meantime the communication state monitoring section 35 checks at predetermined intervals whether communication is possible, and when the system control portion 20 is informed by the communication state monitoring section 35 of the reappearance of communicable state, it causes communication to be restarted. Thus, it is not necessary for the communication state monitoring section 35 to continuously check communication state, which will reduce communication load, and improve the efficiency of communication.

If the server system 3 causes a signal notifying an appropriate path which has been determined by the path determining section to be transmitted to the terminal unit 2, and finds its transmission fails, it causes information about the appropriate path to be stored in its own memory section. Therefore, even if an incommunicable state sets in after transmission of a signal carrying necessary data from the terminal unit 2 is completed but before transmission of a signal notifying an appropriate path from the server system 3 is started, and a communicable state reappears after a while, the terminal unit 2 can safely obtain information about the appropriate path without transmitting a signal carrying necessary data anew, which will improve the operation efficiency of the system.

The terminal unit 2 transmits a signal carrying necessary data via a wireless communication medium 23 to the server system 3, so that the server system can determine an appropriate path based on the data, and receives a signal notifying the path to use the information as a material for navigation guide. Thus, the terminal unit 2 needs to have no map information storing section 41 and path determining section 42, and thus can have a more simplified structure than would be otherwise required. This will help the terminal unit 2 to be smaller and lighter, improve its productivity, and contribute to its reduced cost. In addition, if the system comprises a single server system communicating with plural terminal units, it is possible for the server system to determine an appropriate path for each terminal unit based on updated map information by only updating map information stored in its own memory at appropriate intervals, which will bring about the spread of network users.

Moreover, because communication between the server system and each terminal unit 2 is performed based on unique data assigned to the terminal unit 2, the terminal unit 2 can safely obtain information about an appropriate path specifically directed to the unit, and thus confused communication of wrong information is safely avoided.

Variants of the Embodiment

The present invention is not limited in any way to the above embodiment, but includes various variants thereof as described below, as long as they contribute to the attainment of the object of the present invention.

The above embodiment includes a vehicle as a mobile body, but it may also include any mobile body such as an aircraft, ship, etc. The system may include a base station which serves as a server system communicable with mobile phones or PHSs (Personal Handyphone Systems) which serve as terminal units. In this system, the server system informs the user of an appropriate path by transmitting information about the path to the user's mobile phone or PHS.

According to the above embodiment, communication between the terminal communication section 11 and the server communication section 43 is achieved via a wireless communication medium 23. However, the communication may be achieved, for example, via a cabled network such as Internet.

According to the above embodiment, the system exits from a stand-by state as soon as it finds transmission of a signal from the terminal unit 2 to the server system 3 and then transmission of a signal from the server system 3 to the terminal unit 2 are completed, that is, then the system instructs the terminal unit 2 to delete necessary data stored in its internal memory and the server system 3 to delete the guide information stored in its memory section. However, the system may be configured such that, as soon as the system finds transmission of necessary data from the terminal unit 2 to the server system 3 is achieved, the system will cause necessary data stored in the internal memory of the terminal unit 2 to be deleted. In this configuration, the system may confirm that transmission of necessary data from the terminal unit 2 to the server system 3 is successfully achieved by checking whether the terminal unit has received a signal notifying the reception of necessary data transmitted by the server system 3.

According to the above embodiment, as long as information about an appropriate path transmitted by the server unit 3 is not received by the terminal unit 2, the information is stored in the memory section of the server system 3. However, the server system 3 may not store the information in the memory section but just wait until communicable state reappears, and then after it has received necessary data from the terminal unit 2 to determine an appropriate path based on the data, it may transmit information about the appropriate path to the terminal unit 2. According to this configuration, the server system 3 is relieved of the need for a memory section, and thus it will be able to have a more simplified structure.

According to the above embodiment, communication state between the terminal unit 2 and the server system 3 is checked at predetermined intervals. However, the system may be so configured that communication state is checked only when a request for restarting communication is fed by the user. If the system is so configured that communication state is checked at predetermined intervals, communication will restart automatically as soon as the system finds communication is possible. Then, the terminal unit 2 will be able to safely obtain information about an appropriate path without requiring the user to reenter necessary data. Entry of data by the user may occur via user's voice, which will simplify the input feeding operation and improve the utility of the system.

According to the above embodiment, the current position determining section determines the current position of a mobile body based on data provided by the sensors 14 to 16, and on GPS data provided by the GPS mediated information receiving portion 12. However, the current position determining section may determine the current position of a mobile body by any known method for locating the current position of a mobile body.

According to the above embodiment, the path determining section firstly picks up candidate paths based on information regarding the current position and target point and search condition, and ultimately chooses an appropriate one out of them. However, the path determining section may pick up candidate paths based solely on information regarding the current position and target point, and then the server system 3 may transmit the candidate paths to the terminal unit 2 which then urges the user to choose an appropriate path out of them by operating on the operating portion 17. If the system is configured as mentioned above, that is, only the current position and target point are transmitted from the terminal unit 2, while the server unit 3 transmits candidate paths in response so that an appropriate path can be determined by the terminal unit 2, communication load will be reduced, and the system will be relieved of a complicated operation required for choosing a single appropriate path from among candidate paths, which will improve the utility of the system.

According to the above embodiment, the terminal unit 2 incorporates the terminal communication section 11. However, the terminal communication section 11 may be a separate entity distinct from the terminal unit 2. Then, the terminal communication section may include a mobile phone or PHS. The terminal communication section 11 may be used alone, or in connection with a terminal unit 2 as appropriate.

The specific configurations of the system of this invention, and specific procedures for achieving the method of this invention may take widely different variations while achieving the same object of this invention.

What is claimed is:

1. A navigation guide device comprising:
   current position acquisition section for acquiring information regarding the current position of a mobile body;
   target point acquisition section for acquiring information regarding a target point the mobile body wants to reach;
   information storing section for storing information regarding the current position and target point;
   communication state monitoring section which monitors signal transmission state under which transmission of a signal notifying the current position and target point to a path determining section will occur so that the path determining section can determine an appropriate path connecting the current position with the target point, as well as signal reception state under which reception of a signal notifying the appropriate path determined by the path determining section will occur;

guide information presenting section for presenting guide information based on the received information about the appropriate path; and communication control section which, if the communication state monitoring section finds communication is impossible, instructs the information storing section to store information regarding the current position and target point until communication becomes possible and transmission of the information regarding the current position and target point is completed.

2. A navigation guide device according to claim 1 wherein:

the communication control section instructs the information storing section to store information regarding the current position and target position, until communication becomes possible and information regarding the current position and target point is transmitted to the path determining section so that said section can determine an appropriate path based on the information, and reception of said appropriate path is achieved.

3. A navigation guide device according to claim 1 wherein:

the communication control section suspends transmission of a signal notifying the current position and target point and reception of a signal notifying an appropriate path determined by the path determining section until the communication state monitoring section finds communication is possible.

4. A navigation guide device according to claim 3 wherein:

the communication control section withdraws communication suspension as soon as it finds transmission and reception of said signals are completed.

5. A navigation guide device according to claim 1 wherein:

the communication state monitoring section checks at predetermined intervals whether communication is possible; and the communication control section allows communication to be started only after the communication state monitoring section finds communication is possible.

6. A navigation guide system comprising:

a server system with a path determining section which is capable of communicating with a navigation guide device according to claim 1;

the navigation guide device; and communication section enabling communication between the server system and the navigation guide device.

7. A navigation guide system comprising:

a terminal unit having current position acquisition section for acquiring information regarding the current position of a mobile body, target point acquisition section for acquiring information regarding a target point the mobile body wants to reach, information storing section for storing information regarding the current position and target point, and guide information presenting section for presenting guide information about a path to be taken by the mobile body determined based on the information regarding the current position and target point;

a server system having a path determining section for determining a path to be taken by the mobile body based on the information regarding the current position and target point;

communication section for allowing a signal notifying the current position and target point to be transmitted from the terminal unit to the path determining section of the server system, and a signal notifying the path determined by the path determining section to be transmitted from the server system to the terminal unit;

communication state monitoring section for monitoring the communication state of the communication section; and a communication control section which, if the communication state monitoring section finds communication is not possible, instructs the information storing section to store the information regarding the current position and target point until communication becomes possible and transmission of the information regarding the current position and target point is completed.

8. A navigation guide system according to claim 6 wherein:

the server system comprises a memory section which, provided that a signal notifying a path to be taken by the mobile body determined by the path determining section is not received by the terminal unit, stores information about the path until said signal is successfully received by the terminal unit.

9. A navigation guide system according to claim 7 wherein:

the server system comprises a memory section which, provided that a signal notifying a path to be taken by the mobile body determined by the path determining section is not received by the terminal unit, stores information about the path until said signal is successfully received by the terminal unit.

10. A navigation guide system according to claim 8 wherein:

the server system causes the information about the path stored in the memory section to be transmitted to the terminal unit as soon as the communication state monitoring section finds communication is possible.

11. A navigation guide system according to claim 9 wherein:

the server system causes the information about the path stored in the memory section to be transmitted to the terminal unit as soon as the communication state monitoring section finds communication is possible.

12. A navigation guide method for guiding, by section of calculation section, the navigation of a mobile body by providing the mobile body with necessary information at critical points along a path connecting the current position of the mobile body with its target point comprises the steps of:

acquiring information regarding the current position of the mobile body and its target point;

transmitting the information regarding the current position and target point;

monitoring the reception of a signal carrying information about a path determined based on the information regarding the current position and target point; and, if the monitoring step reveals the impossibility of communication, storing the information regarding the current position and target point in such a manner as to allow ready reading-out until a communicable state reappears and transmission of a signal notifying the current position and target point is completed.

13. A navigation guide method according to claim 12 wherein:

the information regarding the current position and target point is stored until it is confirmed communication becomes possible, and a signal notifying the current position and target point has been transmitted, and a signal notifying a path determined based on the information regarding the current position and target point has been received.

14. A navigation guide method according to claim 12 wherein:

transmission of a signal notifying the current position and target point and reception of a signal notifying the path determined by the path determining section are both suspended until the communication state monitoring section finds communication is possible.

15. A navigation guide method according to claim 14 wherein:

communication suspension is withdrawn as soon as the system finds transmission and reception of said signals are completed.

16. A navigation guide method according to claim 12 wherein:

it is checked at predetermined intervals whether communication is possible; and communication is started as soon as it is confirmed that communication is possible.

17. A navigation guide method according to claim 12 wherein:

the terminal unit installed in a mobile body acquires information regarding the current position of the mobile body and its target point;

a signal carrying information regarding the current position and target point acquired by the terminal unit is transmitted to a server system, thereby permitting the server system to determine an appropriate path based on the information;

a signal notifying the path determined by the server system is transmitted to the terminal unit so that the terminal unit can provide guide information with respect to the tracking of the path.

18. The navigation guide method according to claim 17 wherein:

the server system, when it finds that a signal notifying the path determined by the path determining section is not received by the terminal unit, memorizes information about the path.

19. The navigation guide method according to claim 18 wherein:

the server system, as soon as it finds communication is possible, causes the information about the path stored to be transmitted to the terminal unit.

20. A navigation guide program embodied on a computer readable medium whereby it is possible for a calculation section to effect a navigation guide method according to claim 12.

* * * * *